United States Patent [19]

Tanaka

[11] 4,174,899
[45] Nov. 20, 1979

[54] FILM ADVANCE DEVICE FOR CAMERAS

[75] Inventor: Harumi Tanaka, Kobe, Japan

[73] Assignee: Minolta Camera Kabushiki Kaisha, Osaka, Japan

[21] Appl. No.: 959,131

[22] Filed: Nov. 9, 1978

[30] Foreign Application Priority Data

Nov. 10, 1977 [JP] Japan ............................. 52/135547

[51] Int. Cl.² .............................................. G03B 1/14
[52] U.S. Cl. ........................................................ 354/213
[58] Field of Search ............... 354/204, 206, 212, 213, 354/275

[56] References Cited
FOREIGN PATENT DOCUMENTS 45-9355 5/1970 Japan ...................................... 354/212
819770 9/1959 United Kingdom ..................... 354/212

Primary Examiner—Donald A. Griffin
Attorney, Agent, or Firm—Wolder, Gross & Yavner

[57] ABSTRACT

A camera film metering mechanism includes a driven member coupled to the film takeup spool and having a driven hub, a drive member coupled to a motivating member and including a drive hub end-to-end and coaxial with the driven hub. A helical coupling spring is wound around the hubs and is free and unanchored thereto so that upon rotation of the drive hub in an advance direction, the coil is tightened about hubs to drive couple them and upon rotation of the drive hub in a reverse direction, the hubs are uncoupled. A stop member collar rotatably engages the coil and is connected to the drive member end of the coil and a brake member is advanceable from a spring retracted position into engagement with the stop member in response to the advance of a predetermined length of film to thereby effect the loosening of the coil and the uncoupling between the drive and driven members to stop the film advance.

18 Claims, 3 Drawing Figures

FILM ADVANCE DEVICE FOR CAMERAS

BACKGROUND OF THE INVENTION

The present invention relates generally to improvements in camera film advancing devices and it relates more particularly to an improved film advancing device of the type which responds to the sensing of the completion of advance of an indexed length of film to restrain any excess advace.

Mechanisms of the subject nature are known in the prior art, including a first type in which the film advancing mechanism is braked, during the film advancing operation in response to the completion of advance of a predetermined length of film to thereby stop the film advance. This first type of device is described in U.S. Pat. No. 3,736,854 issued on Jan. 5, 1973 and U.S. Pat. No. 3,748,991 issued on July 31, 1973. With this first type of device, however, the film advance mechanism is suddenly or abruptly restrained in the course of its operation, greatly impairing the smooth operation of the mechanism, and at the same time, imparting an excessive force or shock to the component parts of the mechanism thereby resulting in an early malfunction or damage to the mechanism and greatly reducing its reliability and durability. A second type of device which is described in U.S. Pat. No. 4,009,478 issued Feb. 22, 1977 is so constructed that a clutch mechanism interconnecting a film windup member with a film takeup shaft is disabled to cut off the drive transmission between the two, upon completion of advance of a predetermined length of a film, thus stopping the film advance. Although this construction may eliminate the disadvantages of the first type of device, the second type is unstable in function in that the clutch may not be smoothly or is never reset to an operative condition in which the clutch interconnects the wind-up member and take-up shaft. A third type of mechanism which is described in U.S. Pat. No. 3,829,875, issued Aug. 13, 1974 uses planetary gears to disable the film advance mechanism during operation in response to a signal sensing the completion of an advance of a predetermined length of film, thereby stopping the film advance. Instead of restraining the movement of the film windup member, this type of mechanism absorbs the excess drive movement, thereby eliminating the disadvantages of the first type. However, a large number of gears are required for this type of device, thus resulting in a complex construction. In addition, a fourth type of mechanism uses a coil spring through which the film windup member and the film takeup shaft are drive coupled to transmit power from the film wind-up member to the film takeup shaft through the action of the tightening of the coil spring to advance the film, and to open or cut off the drive transmission through the loosening of the coil spring when a predetermined length of film has been advance, i.e., when a film frame advance has been completed, thus preventing an excess of film advancing. This type of mechanism is advantageous in that the film advance is stopped without restraining the movement of the film wind-up member to thus provide smooth film advance operation, the power or drive transmission or cutoff can be controlled through the tightening or loosening of the coil spring to assure functional stability, and only a coil spring is required as the power transmission or cutoff controlling means permitting a very simple construction.

The present invention relates to improvements in the above-identified fourth type of film advance mechanism or device, which type is described in Japanese Utility Model Publication No. 45-9355 issued on May 1, 1970. The device described in the above publication employs a construction in which a coil spring is wound around a film-advance shaft integrally rotatable with a wind-up lever, one free end of the coil spring being fixed to a spool shaft and the other end to a stop gear rotatably fitted to the shaft of the wind-up lever. In this device, the coil spring tightens on the wind-up shaft in response to the shaft rotation, and thus the coil spring is rotated integrally with the film advance shaft. The rotation of the coil spring is transmitted through its free end to the spool shaft by which the film is advanced. When a predetermined length of film has been advanced, the stop gear is restrained to stop the other end of the coil spring. Because the coil spring is rotated, this stopping produces an acting force to loosen the coil spring. When this end of the coil spring is stopped, therefore, the coil spring is immediately loosened to stop its rotation, cutting off the drive transmission from the wind-up shaft to the spool shaft and thus causing the film advance to be stopped. With the aforesaid device, however, the power transmission from the wind-up shaft as a drive member to the spool shaft as a driven member is effected through the free end of the coil spring alone, the device thus posing a problem in durability. In other words, this device is constructed such that the spool shaft is rotated by the free end bent radially from the coil spring, and with a greater load applied to the spool shaft or after long use of the device, the bent end of the coil spring may be broken or deformed to disengage the spool shaft, thus disabling the power transmission.

SUMMARY OF THE INVENTION

Accordingly, it is a primary object of the present invention to provide an improved film-advance device using a coil spring as a disengagable drive coupling.

Another object of the present invention is to provide a film-advance device which is highly reliable, rugged, simple in construction and easy to assemble.

Still another object of the present invention is to provide a film-advance device which is of great durability.

The above and other objects of the present invention will become apparent from a reading of the following description taken in conjunction with the accompanying drawings which illustrate a preferred embodiment thereof.

In a sense the present invention contemplates the provision in a camera of an improved mechanism for advancing predetermined lengths of film, the mechanism comprising a rotatable drive member including a drive hub, a rotatable driven member including a driven hub coaxial with and preferably end-to-end with the drive hub, the drive member being manually or otherwise rotated and the driven member motivating the film advance, a coupling coil snugly encircling and free of and unanchored to both hubs and a braking mechanism for stopping the rotation of an end of the coil, the drive member end, in response to the advance of a predetermined length of film. Thus, advance rotation of the drive member tightens the coil about the hubs and drive couples the drive and driven member to advance the film while reverse rotation of the drive member loosens the coil and drive uncouples the hubs to stop the film advance. The braking or prevention of rotation of the coil end loosens the coil independently of the drive member direction of rotation thereby stopping the film advance in response to the advance of the predetermined length thereof.

The improved film advancing and metering mechanism is simple, rugged, inexpensive, highly reliable, of great durability and high versatility and adaptability.

DETAILED DESCRIPTION OF THE PREFERRED EMBODIMENT

Figure 1:
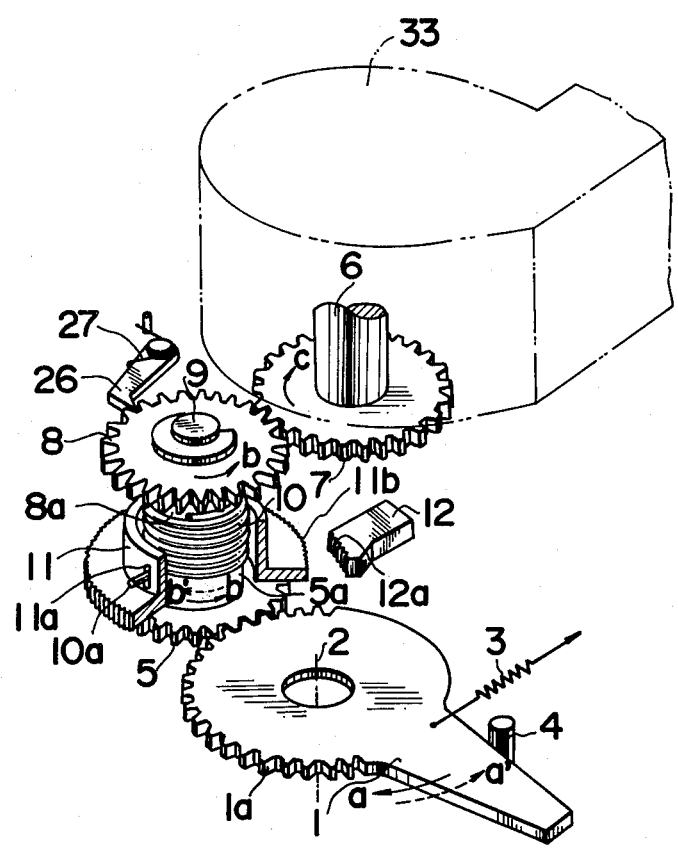
FIG. 1 is a perspective view of the essential part of a film-advance device according to a preferred embodiment of the present invention.

Referring now to the drawings which illustrates a preferred embodiment of the present invention, a wind-up lever 1 swingably fixed to a shaft 2 is biased to swing counterclockwise by a spring 3 and is limited by a pin 4 to its initial or return position. A first gear 5 directly engages a gear 1a formed integrally with wind-up lever 1, and a second gear 8 directly engages a driven gear 7 provided at the lower part of a film takeup shaft 6. Both first gear 5 and second gear 8 are coaxially independently rotatably supported by a common shaft 9 and are provided with hollow shafts or hubs 5a and 8a respectively which are in coaxial end-to-end engagement and of equal diameter and opposed to each other. Wound on the outer peripheral faces of both cylindrical hubs 5a and 8a is a helical or coil spring 10 whose inner diameter is set to be equal to or smaller than the outer diameter of respective hubs 5a and 8a. This causes the inner surface of coil spring 10 to be always in contact with the outer peripheral surfaces of both hubs 5a and 8a when the former is set around the latter, as shown in FIG. 1. Coil spring 10 is wound in the opposite direction (in the direction indicated by an arrow b') to the rotational direction (indicated by an arrow b) of hub 5a at the time of a film-advance operation. Accordingly, when hub 5a is rotated in the film-advancing direction (in the direction of arrow b), the frictional force effected between hub 5a and the inner surface of coil spring 10 reduces the inner diameter of the spring causing the spring to tighten on hub 5a. Thus, coil spring 10 tightens on hub 8a of second gear 8 to firmly grasp it, causing second gear 8 to rotate in response to the rotation of the first gear 5 in the same direction.

As described earlier, when coil spring 10 is wound in the opposite direction (indicated by arrow b') to the film-advancing direction of hub 5a, the inner diameter of coil spring 10 increases due to the frictional force between hub 5a and the inner surface of the spring causing the spring 10 to loosen when hub 5a is rotated in the opposite direction (indicated by arrow b') to the film-advance direction. Therefore, when first gear 5 is rotated in the opposite direction (indicated by arrow b') to the film-advancing direction (indicated by arrow b), the drive coupling between hubs 5a and 8a by coil spring 10 is released, and the rotation of first gear 5 in the direction of arrow b' is not transmitted to second gear 8. As a result, even if first gear 5 is rotated in the direction shown by arrow b' opposed to the film-advancing direction when film-advance lever 1 rotates to its initial position in the direction of an arrow a' by the action of spring 3 after a film-advance operation, the rotation of first gear 5 is not transmitted to second gear 8. Accordingly, the rotation of film-advance lever 1 in the opposite direction (in the direction of arrow b') to the film-advance direction does not affect the takeup condition of the film. This makes it possible to operate film-advance lever 1 repeatedly in short strokes for advancing the film.

Figure 3:
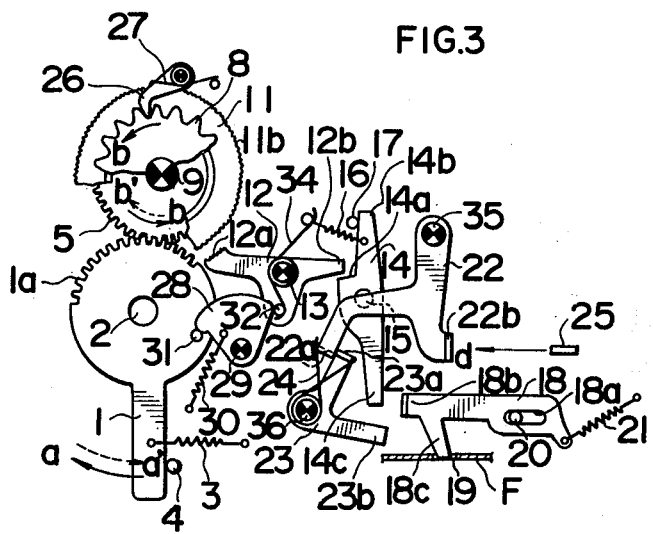
FIG. 3 is a plan view of the full mechanism of the device according to the embodiment shown in FIG. 1.

A cylindrical stop member 11 for stopping the film advance is substantially coaxially located between first and second gears 5 and 8 and loosely engages the outer surface of coil spring 10. A small hole 11a is formed in stop member 11, and one end 10a of coil spring 10 on the side of first gear 5 is bent radially outwardly and engages and is restrained by hole 11a. Furthermore, integrally formed with stop member 11 at its bottom circumference is a peripherally toothed annular member or stop gear 11b which is engageable by a brake or metering member 12 for stopping the film advance. Metering member 12 for stopping the film advance is swingably pivoted by a shaft 13, as shown in FIG. 3, and is biased by a spring 34 so that a serrated end face or tip tooth 12a of member 12 engages stop gear 11b. Metering member 12 for stopping the film advance is normally restrained in a position where tip tooth 12a is disengaged or spaced from stop gear 11b by a release member 28 controlled by wind-up lever 1 and the end of an arm 12b of metering member 12 is opposed to a shoulder portion 14a of a release lever 14. Release lever 14 swingably pivoted by a shaft 15 is biased counterclockwise by a spring 16, with one end 14b thereof abutting against a stop pin 17. Release lever 14 in its biased stopped condition positions its shoulder portion 14a within the rotation path of the tail end of arm 12b of metering member 12.

Shown at F is a film strip carried by a film cartridge 33 and a perforated along one edge at predetermined intervals with film frame indexing apertures 19. A sensing member 18 is designed to sense the advance of a predetermined length of film. The film sensing member 18 is rotatably and slidably carried by a pin 20 which engages a longitudinal slot 18a formed in sensing member 18. Provided on film sensing member 18 are a bent portion or lug 18b opposing the other end 14c of release lever 14 opposite end 14b, and a film sensing pawl or finger 18c engageable with individual film frame indexing perforations carried by the film F. A spring 21 biases film sensing member 18 in the retracting direction to the right and counterclockwise as viewed in FIG. 3 and to bias film sensing pawl 18c so that it lightly engages film F, whereby film sensing pawl 18c can be moved from a retracted or inactive position in engagement with the film surface to an extended or active position engaging one of the perforations and spaced from the retracted or inactive position along the film surface. A first reset angular lever member 22 and a second reset angular lever member 23 functions to reset film sensing member 18 from its active position to its inactive position and are pivotally supported by shafts 35 and 36 respectively. Bent portions 22a and 23a fromed on proximate respective ends of both reset members 22 and 23 are connected by a spring 24 so that they are in side by side engagement, both reset members 22 and 23 being resiliently maintained by spring 24 in the neutral position shown in FIG. 3. In this neutral condition, first reset member 22 is provided with and positions a receiving portion 22b in the path of a shutter release signal member 25, second reset member 23 is provided with and positions an operating end 23b near film F at the extended position of a bent portion 18b of film sensing member 18.

A film rewind prevention pawl or claw 26 is biased by a spring 27 to normally engage second gear 8, thus preventing second gear 8 from turning clockwise or back. Release member 28 is swingably pivoted on a shaft 29 and is biased by a spring 30 so that it abuts a pin 31 carried by wind-up lever 1. When wind-up lever 1 is moved to its initial position as shown in FIG. 3, release member 28 pushes a pin 32 carried by metering member 12 to rotate metering member 12 counterclockwise, thereby retracting tooth 12a thereof from stop gear 11b of stop member 11, as earlier described. It should be noted that film F is housed in cartridge 33 and that driven gear 7 engaging second gear 8, and takeup shaft 6 carrying driven gear 7 are provided on cartridge 33. Second gear 8 is arranged to engage and mesh with driven gear 7 when cartridge 33 is loaded into the camera.

Figure 2:
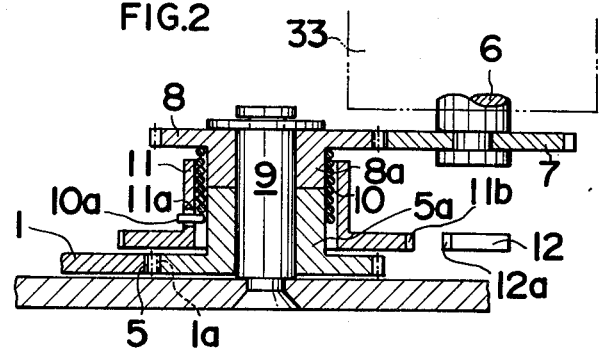
FIG. 2 is a cross-sectional view thereof.

In the condition of the mechanism shown in FIGS. 1 and 2, when wind-up lever 1 is rotated in the direction of arrow a against the influence of spring 3, first gear 5 is rotated in the direction of arrow b, and in response to the rotation of first gear 5, coil spring 10 tightens on hubs 5a and 8a. The tightening of coil spring 10 results in first and second gears 5 and 8 being firmly drive coupled by coil spring 10, and second gear 8 together with coil spring 10 and stop member 11 is thus rotated in the same direction of arrow b as first gear 5. The rotation of second gear 8 is transmitted through driven gear 7 to film takeup shaft 6, whereby film F is advanced. When wind-up lever 1 is returned in the direction of arrow a' under the influence of spring 3 after wind-up lever 1 has been swung in the direction of arrow a, first gear 5 is rotated in the direction of arrow b'. Due to the rotational inversion, coil spring 10 is loosened, causing second gear 8 to be uncoupled from first gear 5. Consequently, wind-up lever 1 is smoothly returned in the direction of arrow a', with second gear 8 being blocked by pawl 26 from turning back. Release member 18 is rotated counterclockwise in response to wind-up lever 1 being rotated in the direction of arrow a, thus releasing the restraint of metering member 12. However, metering member 12 is rotated only slightly clockwise under the influence of spring 34, the tail end 12b abutting the shoulder portion 14a of release lever 14, thereby restraining metering member 12, instead of release member 28, at a position where tooth 12a is disengaged from stop gear 11b.

By being taken up on film takeup shaft 6 by the rotation of wind-up lever 1, film F advances to the left as viewed in FIG. 3. When the advanced length of film F approaches a predetermined amount such as a unit frame during one or more film-advance operations of wind-up lever 1, film sensing member 18 with its sensing pawl 18c in contact with film F is moved to the left by film F against the influence of spring 21 when the film sensing pawl 18c engages an indexing perforation 19 in film F. When the predetermined length of film F is advanced, bent portion 18b of film sensing member 18 engages the other end 14c of release lever 14 and rotates release lever 14 clockwise against the influence of spring 16, whereby metering member 12 is released from its restraint by shoulder 14a of release lever 14, and rotates further through the influence of spring 34 in the clockwise direction to advance tooth 12a into braking engagement with stop gear 11b of stop member 11.

Therefore, upon completion of film F advance, stop member 11 is restrained, thereby releasing the connection of first and second gears 5 and 8 through coil spring 10. The braking or halting of stop member 11 acts as a force in the direction of arrow b' on the end 10a of coil spring 10 which is rotated in the direction of arrow b together with first gear 5, causing coil spring 10 to be loosened to release the drive coupling between first and second gears 5 and 8. The rotation or drive transmission from first gear 5 to second gear 8 is thus cut off, thus causing second gear 8 to stop together with driven gear 7 and film takeup shaft 6 when the predetermined increment film advance has been completed, whereby advance operation of the film F terminates. At this time, stop member 11 alone is restrained while first gear 5 is not restrained, and therefore, wind-up lever 1 is not restrained even if it is in operation, thus resulting in a smooth film-advance operation.

After completion of the unit frame film-advance operation, wind-up lever 1 is returned under the influence of spring 3 to its initial position as shown in FIG. 3. At the same time, release member 28 is returned to its initial position to retract metering member 12 from its engagement with and restraint of stop member 11 to return it to its initial position where tooth 12a is disengaged from stop gear 11b, and release member 28 is made ready for the next film-advance operation. In the condition in which the shutter is not released, however, release lever 14 is pushed by film sensing member 18 to rotate clockwise to retract shoulder 14a out of the path of tail end 12b of metering member 12 to release the restraint of metering member 12. This causes tooth 12a of metering member 12 to advance without any interruption by shoulder 14a even when wind-up lever 1 is operated again, tooth 12a immediately engaging stop gear 11b to restrain stop member 11, thereby disabling the advance of film beyond the predetermined length.

With the shutter released after the film has been advanced, a signal member 25 linked with the shutter release travels toward the direction of the arrow d in FIG. 3 to abut receiving portion 22b of first reset member 22 and push it. This causes first reset member 22 to rotate in a clockwise direction, and second reset member 23 is thereby rotated through spring 24 in a counterclockwise direction and pushes bent portion 18b of film sensing member 18 located in the path of rotation of operating end 23b in a direction away from film F. Film sensing member 18 is returned to its initial position when film sensing pawl 18c is retracted out of engagement with film perforation 19 and released, then returned to the right as viewed in FIG. 3 under the influence of spring 21 and then retracted from operating end 23b of second reset member 23. When the cocking or charging of the shutter is effected, and signal member 25 is returned to its initial position, first and second reset members 22 and 23 return to their initial stop positions under the influence of spring 24. The above-explained operation is thereafter repeated.

While the above-described mechanism represents a preferred form of the present invention as applied to a type of camera in which a 110 size cartridge (manufactured by EASTMAN KODAK CO.) housing a film with indexing perforations formed therein for metering unit frames to be exposed is used, and the completion of the unit frame increment film advance is effected by sensing an indexing perforation in the film to operate a member for stopping the film advance, it should be understood that the present invention may be applied to different types of cameras using other types of film and film increment advance detection. In addition, to ensure a positive power transmission between the first and second gears through the tightening action of the coil spring, either the hub outer peripheral surfaces of the first and second gears or the inner surface of the coil spring may be made rough to produce greater friction therebetween. This is particularly of great advantage when the first and second gears are made of plastic with low friction, high slide properties and employed in cameras of lightweight, low cost and low operational noise and the like.

According to the present invention, power or drive transmission from a wind-up lever to a film takeup shaft is made by using the tightening action of a coil spring, and the coil spring is loosened by restraining a stop member connected only to one end of the coil spring after completion of an advance of a predetermined length of film in order to stop any excess of film advancing. Thus, the forcible restraining stress upon completion of the film advance affects only the stop member connected to one end of the coil spring. Furthermore, the coil spring is fitted around the hubs of the first and second gears without any anchoring or direct connection to the gears, and yet the coil spring immediately loosens on the hubs when the restraining force acts on the stop member to disconnect or drive uncouple the first and second gears. Therefore, even if a high restraining force suddenly is applied, no excessive force acts on any members, resulting in no damage or impairment to any members resulting in a greatly enhanced durability. In addition, the disadvantage that the wind-up lever is suddenly restrained during operation by the film advance stopping member is completely eliminated. According to the present invention, moreover, the coil spring is wound around hubs of the two gears to be disconnected, one end of the coil spring being connected to the stop member linked with one of the gears, the device thus possessing the advantage that it is simple and rugged in construction, convenient for assembly, low cost, of great durability, reliability and of high versatility and adaptability.

While there has been described and illustrated a preferred embodiment of the present invention, it is apparent that numerous alterations, omissions and additions may be made without departing from the spirit thereof.

I claim:

1. In a camera, a mechanism for advancing predetermined lengths of film comprising:
   a rotatable drive member including a first hub;
   a rotatable driven member including a second hub coaxial with said first hub;
   means for rotating said drive member including said first hub;
   means actuated by said driven member for advancing said film;
   a helical resilient coupling coil engaging the outer peripheral faces of said hub whereby to transmit the rotation of said first hub to said second hub when said first hub is rotated in a first forward direction and to drive uncouple said hubs when said first hub is rotated in a second reverse direction; and
   release means responsive to the advance of a predetermined length of said film for preventing the rotation of an end of said coupling coil whereby to effect the drive uncoupling between said hubs independently of the direction of rotation of said first hub.

2. The mechanism of claim 1 wherein said hubs are end-to-end hollow stub shafts of equal diameters and comprising an axle rotatably engaging said hollow stub shafts.

3. The mechanism of claim 1 wherein said coupling coil is unanchored to said drive and driven members.

4. The mechanism of claim 3 wherein said release means comprises a stop member connected to an end of said coupling coil and rotatable therewith, a brake member movable between advanced and retracted positions into and out of engagement with said stop member to respectively prevent and permit the rotation of said stop member and means responsive to said advance of said predetermined length of film to advance said brake member into engagement with said stop member.

5. The mechanism of claim 4 wherein said stop member comprises a collar rotatably engaging said coupling coil and including an outwardly directed peripheral flange and having a recess therein, and end of said coil terminating in an outwardly directed leg engaging said recess and said brake member is movable into and out of braking engagement with said peripheral flange.

6. The mechanism of claim 4 comprising means restricting the rotation of said driven member to a film advancing direction.

7. The mechanism of claim 4 wherein said drive member rotating means comprises a hand lever coupled to said drive member and rotatable therewith in a film advancing forward direction and a reverse direction and spring biased for movement in said reverse direction to a retracted position.

8. The mechanism of claim 4 including means responsive to the reverse rotation of said drive member for retracting said brake member from engagement with said stop member.

9. The mechanism of claim 4 wherein said release means comprises spring means urging said brake member into engagement with said stop member means for releasably locking said brake member in a retracted position and means responsive to said advance of said film said predetermined length for releasing said locking means.

10. The mechanism of claim 4 wherein said film has longitudinally spaced frame indexing apertures formed therein and said release means comprises means for sensing said aperture and is responsive to the sensing of an aperture by said sensing means to advance said brake member into engagement with said stop member.

11. The mechanism of claim 10 wherein said sensing means comprises a sensing member including a finger movable into and out of engagement with an aperture and resiliently biased in an aperture engaged position and comprising means responsive to the camera shutter release for retracting said finger out of engagement with said aperture.

12. The mechanism of claim 1 comprising a film cartridge replaceably housed in said camera and including a film takeup spool and a gear rotatable therewith defining said film advancing means, said driven member including a gear rotatable with said second hub and separably engaging said spool gear.

13. A camera comprising:
   a wind-up member externally manually movable from a retracted position;

a first member rotatable about an axis in response to the movement of said wind-up member and having a circumferential periphery;

a second member rotatable about said axis and having a circumferential periphery;

film advance means including a movable member movable in response to the rotation of said second member to advance a film loaded in the camera;

a coil spring encircling said peripheries of said first and second member, said coil spring being tightened so as to grasp said first and second members when said first member is rotated in a predetermined direction but being loosened so as to release said first and second members when said first member is rotated in opposite direction to said predetermined direction; and means for disabling a tightening operation of said coil spring in spite of the rotation of said first member.

14. A camera as set forth in claim 13, wherein said means for disabling includes means for preventing the free end of said coil spring which is proximate said first member from rotating.

15. A camera as set forth in claim 14, wherein said disabling means comprises a control gear surrounding said periphery of said first member and holding said free end of said coil spring, said control gear being rotatable relative to said coil spring; a stop lever movable between an inactive position wherein said lever is disengaged from said control gear and an active position wherein said lever engages said control gear to prevent said control gear from rotating; and control means for moving said stop lever from said inactive to said active position in response to the advance of a predetermined length of film.

16. A camera as set forth in claim 15, wherein said camera employs a roll film with perforations at predetermined metering intervals, and said control means comprises biasing means for biasing said stop lever from said inactive to said active position, a film sensing member engageable with a film perforation and movable by the advancing film from a first position to a second position spaced from said first position, a first blocking member interconnecting said stop lever and said film sensing member and movable between a blocking position wherein said blocking member prevents said stop lever from moving to said active position and a release position wherein said blocking member allows the movement of said stop lever, said first blocking member being movable from blocking to release position in response to said sensing member being moved to said second position, and a second blocking member interconnecting said wind-up member and said stop lever, for preventing said stop lever from moving and maintaining said stop lever in said inactive position in response to said wind-up member being in said retracted position.

17. A camera as set forth in claim 13, wherein the diameters of said circumferential peripheries of said first and second members are equal and said first and second members are end-to-end coaxially supported to form a continuous peripheral surface.

18. A camera as set forth in claim 17, wherein said movable member includes a gear member integrally formed with said second member, said gear member actuating said film advance means to advance the film when rotated in a predetermined direction, and further comprising a pawl resiliently urged into engagement with said gear to restrict the rotation direction of said gear to said predetermined direction.

* * * * *